United States Patent
Deng

(10) Patent No.: US 10,473,991 B2
(45) Date of Patent: Nov. 12, 2019

(54) MANUFACTURING METHOD OF LIQUID CRYSTAL DISPLAY PANEL

(71) Applicant: SHENZHEN CHINA STAR OPTOELECTRONICS SEMICONDUCTOR DISPLAY TECHNOLOGY CO., LTD., Shenzhen, Guangdong (CN)

(72) Inventor: Zhuming Deng, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/573,317

(22) PCT Filed: Aug. 29, 2017

(86) PCT No.: PCT/CN2017/099395
§ 371 (c)(1),
(2) Date: Nov. 10, 2017

(87) PCT Pub. No.: WO2019/015020
PCT Pub. Date: Jan. 24, 2019

(65) Prior Publication Data
US 2019/0155116 A1    May 23, 2019

(30) Foreign Application Priority Data

Jul. 20, 2017 (CN) .......................... 2017 1 0594966

(51) Int. Cl.
G02F 1/1362 (2006.01)
G02F 1/1339 (2006.01)
G02F 1/1368 (2006.01)
G02F 1/13 (2006.01)

(52) U.S. Cl.
CPC ...... G02F 1/136209 (2013.01); G02F 1/1303 (2013.01); G02F 1/1362 (2013.01); G02F 1/1368 (2013.01); G02F 1/13394 (2013.01); G02F 2001/13396 (2013.01); G02F 2001/13398 (2013.01); G02F 2001/136222 (2013.01); G02F 2001/136236 (2013.01)

(58) Field of Classification Search
None
See application file for complete search history.

(56) References Cited

U.S. PATENT DOCUMENTS

| 6,218,206 B1* | 4/2001 | Inoue ................. H01L 29/66765 257/E21.414 |
| 2005/0001967 A1* | 1/2005 | Chae ..................... G02F 1/1362 349/139 |
| 2007/0002259 A1* | 1/2007 | SangChul ......... G02F 1/133345 349/155 |

(Continued)

Primary Examiner — Khaja Ahmad

(57) ABSTRACT

The present invention provides a manufacturing method of a liquid crystal display panel, the color filter layer is formed on the TFT array substrate, at least a portion of the first color resist layer disposed on the gate line of the first substrate is used as a color resist protrusion, the spacer material and the black matrix material are integrated into same material, and the spacer and the black matrix are formed on the TFT array substrate through utilizing a multi-tone mask and only one lithography process.

18 Claims, 6 Drawing Sheets

(56) References Cited

U.S. PATENT DOCUMENTS

| | | | |
|---|---|---|---|
| 2010/0301327 A1* | 12/2010 | Kang | G02F 1/1333 |
| | | | 257/43 |
| 2014/0253856 A1* | 9/2014 | Nakahata | H01L 51/525 |
| | | | 349/139 |
| 2016/0139468 A1* | 5/2016 | Kim | G02F 1/134309 |
| | | | 349/43 |

* cited by examiner

MANUFACTURING METHOD OF LIQUID CRYSTAL DISPLAY PANEL

CROSS REFERENCE TO RELATED APPLICATIONS

This application is a U.S. National Phase application submitted under 35 U.S.C. § 371 of Patent Cooperation Treaty Application serial No. PCT/CN2017/099395, filed on Aug. 29, 2017, which claims the priority of China Patent Application serial No. 201710594966.6, filed on Jul. 20, 2017, the disclosures of which are incorporated herein by reference in its entirety.

FIELD OF THE INVENTION

The present invention relates to manufacturing technologies of flat panel displays, and more particularly to a manufacturing method of a liquid crystal display panel.

BACKGROUND OF THE INVENTION

Currently, liquid crystal displays (LCD) are most widely used display products on the market, production technologies are very mature, yield of products is high, production costs are relatively low, and market acceptance is high.

Most of the liquid crystal displays on the market are backlight type liquid crystal display devices, which include liquid crystal display panels and backlight modules. Usually a liquid crystal display panel is composed of a color filter (CF) substrate, an array substrate, and a liquid crystal and a sealing glue frame (i.e., sealant) which are located between the color filter substrate and the array substrate, wherein the CF substrate mainly includes a color filter layer containing a plurality of color resist units (R/G/B) that a light passes through the color resist units and transfers into a colored light, a black matrix (BM) that prevents light leakage at an edge of a pixel, and a spacer (photo spacer, PS) that maintains the cell thickness. A liquid crystal display controls orientation of the liquid crystal molecules through an electric field, thereby changing the polarization state of light emitting, and by utilizing a polarizer to achieve the penetration or blocking in a light path, for purpose of display.

Black photo spacer (BPS) is a new type of material that combines properties of conventional materials such as a better elastic restoring force and lower contamination of liquid crystal etc., and further has a higher optical density, and thus can achieve light barrier functions and thereby achieve effect of a black matrix. Currently, the BPS material is typically subjected to a photolithography process by using a multi-tone mask (MTM) which has a first patterning portion, a second patterning portion, and a third patterning portion having different light transmittances, for simultaneously and respectively, from the BPS material, at the same process, forming a main spacer, an auxiliary spacer, and a black matrix which have a height difference. FIG. 1 illustrates a film structure of a liquid crystal display panel in the conventional art. The transmittances of a multi-tone mask are respectively 100%, 30%, and 20%. A region of 100% transmittance corresponds to a main spacer region 110, a region of 30% transmittance corresponds to an auxiliary spacer area 111, a region of 20% transmittance corresponds to a black matrix 112, and these three structures are simultaneously formed by only one mask process. However, the MTM is complicated and expensive, and photolithography process of BPS is more difficult to adjust (need to give consideration to three different heights). Sub spacer (such as sub photo spacer, Sub PS) has a poor uniformity of height.

SUMMARY OF THE INVENTION

The present invention provides a manufacturing method of a liquid crystal display panel to improve the uniformity of height of an auxiliary spacer and reduce the difficulty of the process and the cost of production.

In order to achieve the above objects, the technical solution provided by the present invention is as follows:

The present invention provides a manufacturing method of a liquid crystal display panel, comprising:

a step S40 of using a first mask to process a color filter film, such that the color filter film is formed with a pixel unit region and a light barrier region separated from each other, wherein at least a part of a first color resist layer is disposed on a gate line of a first substrate;

a step S50 of depositing a first passivation layer on the first color resist layer to form a via of the passivation layer, and then forming a pattern of a plurality of pixel electrodes.

a step S60 of coating a first photoresist layer on the first passivation layer;

a step S70 of patterning the first photoresist layer by a multi-tone mask to form a first protrusion, a second protrusion, and a black matrix, wherein the first protrusion is located above the first color resist layer disposed on the gate line, color of the color resist units of the first protrusion and color of the color resist units of the second protrusion adjacent to each other is the same; and a step S80 of aligning and attaching a second substrate to the first substrate, and instilling a liquid crystal material into a space between the second substrate and the first substrate.

According to a preferred embodiment of the present invention, before the step S40, the manufacturing method further comprises:

a step S10 of forming a thin film transistor layer on the first substrate;

a step S20 of depositing a second passivation layer on the thin film transistor layer; and a step S30 of forming the color filter film on the second passivation layer.

According to a preferred embodiment of the present invention, the step S10 further comprises:

a step S11 of providing the first substrate;

a step S12 of forming a gate and the gate line of the thin film transistor on the first substrate by using a second mask; and a step S13 of forming a gate insulating layer, an active layer, a source electrode, a drain electrode, and a third passivation layer of the thin film transistor on a surface of the first substrate by using a third mask.

According to a preferred embodiment of the present invention, the step S50 further comprises:

a step S51 of depositing the first passivation layer on the first color resist layer;

a step S52 of coating a second photoresist layer on the first passivation layer;

a step S53 of exposing and developing the second photoresist layer to form the via of the first passivation layer on the first passivation layer;

a step S54 of coating a transparent metal layer on the first passivation layer; and a step S55 of peeling the second photoresist layer off, so as to form the pattern of the pixel electrodes.

According to a preferred embodiment of the present invention, the step S70 further comprises steps of:

exposing the first photoresist layer by using a multi-stage transmittance mask to pattern the first photoresist layer to form the first protrusion, the second protrusion, and the black matrix, wherein the multi-stage transmittance mask includes a first transmittance region, a second transmittance region, and a third transmittance region.

According to a preferred embodiment of the present invention, a height of the first protrusion is greater than a height of the second protrusion in a direction perpendicular to a plane of the liquid crystal display panel; and wherein the first protrusion is a main spacer and the second protrusion is an auxiliary spacer.

According to a preferred embodiment of the present invention, light transmittances of the first transmittance region, the second transmittance region, and the third transmittance region are sequentially decreased; wherein the first transmittance region corresponds to the first protrusion and the second protrusion, the second transmittance region corresponds to the black matrix, and the third transmittance region corresponds to the pixel unit area; and wherein the first protrusion, the second protrusion, and the black matrix are located within the light barrier region.

According to a preferred embodiment of the present invention, the color filter film comprises a red color resist unit, a green color resist unit, and a blue color resist unit; and wherein the first color resist layer is selected from one of the red color resist unit, the green color resist unit, and the blue color resist unit.

According to a preferred embodiment of the present invention, the first photoresist layer is a black photoresist material which is a negative photoresist.

The present invention is provided a manufacturing method of a liquid crystal display panel, comprising:

a step S40 of using a first mask to process a color filter film, such that the color filter film is formed with a pixel unit region and a light barrier region separated from each other, wherein at least a part of a first color resist layer is disposed on a gate line of a first substrate;

a step S50 of depositing a first passivation layer on the first color resist layer to form a via of the passivation layer, and then forming a pattern of a plurality of pixel electrodes;

a step S60 of coating a first photoresist layer on the first passivation layer;

a step S70 of patterning the first photoresist layer by a multi-tone mask to form a first protrusion, a second protrusion, and a black matrix; and a step S80 of aligning and attaching a second substrate to the first substrate, and instilling a liquid crystal material into a space between the second substrate and the first substrate.

According to a preferred embodiment of the present invention, before the step S40, the manufacturing method further comprises:

a step S10 of forming a thin film transistor layer on the first substrate;

a step S20 of depositing a second passivation layer on the thin film transistor layer; and a step S30 of forming the color filter film on the second passivation layer.

According to a preferred embodiment of the present invention, the step S10 further comprises:

a step S11 of providing the first substrate;

a step S12 of forming a gate and the gate line of the thin film transistor on the first substrate by using a second mask; and a step S13 of forming a gate insulating layer, an active layer, a source electrode, a drain electrode, and a third passivation layer of the thin film transistor on a surface of the first substrate by using a third mask.

According to a preferred embodiment of the present invention, the step S50 further comprises:

a step S51 of depositing the first passivation layer on the first color resist layer;

a step S52 of coating a second photoresist layer on the first passivation layer;

a step S53 of exposing and developing the second photoresist layer to form the via of the first passivation layer on the first passivation layer;

a step S54 of coating a transparent metal layer on the first passivation layer; and a step S55 of peeling the second photoresist layer off, so as to form the pattern of the pixel electrodes.

According to a preferred embodiment of the present invention, the step S70 further comprises steps of:

exposing the first photoresist layer by using a multi-stage transmittance mask to pattern the first photoresist layer to form the first protrusion, the second protrusion, and the black matrix, wherein the multi-stage transmittance mask includes a first transmittance region, a second transmittance region, and a third transmittance region.

According to a preferred embodiment of the present invention, a height of the first protrusion is greater than a height of the second protrusion in a direction perpendicular to a plane of the liquid crystal display panel; and wherein the first protrusion is a main spacer and the second protrusion is an auxiliary spacer.

According to a preferred embodiment of the present invention, light transmittances of the first transmittance region, the second transmittance region, and the third transmittance region are sequentially decreased; wherein the first transmittance region corresponds to the first protrusion and the second protrusion, the second transmittance region corresponds to the black matrix, and the third transmittance region corresponds to the pixel unit area; and wherein the first protrusion, the second protrusion, and the black matrix are located within the light barrier region.

According to a preferred embodiment of the present invention, the color filter film comprises a red color resist unit, a green color resist unit, and a blue color resist unit; wherein the first color resist layer is selected from one of the red color resist unit, the green color resist unit, and the blue color resist unit.

According to a preferred embodiment of the present invention, the first photoresist layer is a black photoresist material which is a negative photoresist.

The present invention has the advantages: in comparison with the prior art, the color filter layer of the present invention is formed on the TFT array substrate, at least a portion of the first color resist layer disposed on the gate line of the first substrate is used as a color resist protrusion, the spacer material and the black matrix material are integrated into same material, and the spacer and the black matrix are formed on the TFT array substrate through utilizing a multi-tone mask and only one lithography process. Thus, the uniformity of the auxiliary spacer is improved, the difficulty of the processes are reduced, and the cost is saved.

DESCRIPTION OF THE DRAWINGS

In order to more clearly illustrate the technical solutions in the embodiments or the prior art, the following drawings, which are intended to be used in the description of the embodiments or the prior art, will be briefly described. It will be apparent that the drawings and the following description are only some embodiments of the present invention. Those of ordinary skill in the art may, without creative efforts, derive other drawings from these drawings.

DETAILED DESCRIPTION OF THE PREFERRED EMBODIMENTS

The structure and the technical means adopted by the present invention to achieve the above and other objects can be best understood by referring to the following detailed description of the preferred embodiments and the accompanying drawings. Furthermore, directional terms described by the present invention, such as upper, lower, front, back, left, right, inner, outer, side, longitudinal/vertical, transverse/horizontal, etc., are only directions by referring to the accompanying drawings, and thus the used directional terms are used to describe and understand the present invention, but the present invention is not limited thereto.

The present invention is directed against the problems in the conventional art of liquid display panel manufacturing technologies, that although the three-tone mask process can form a black matrix and a spacer in only one mask process, the three-tone mask process makes a surface of an auxiliary spacer uneven, and the processes are complicated and the manufacturing cost is high. Therefore, a manufacturing method of a liquid crystal display panel is proposed, and the embodiment can improve the disadvantage.

Figure 1:
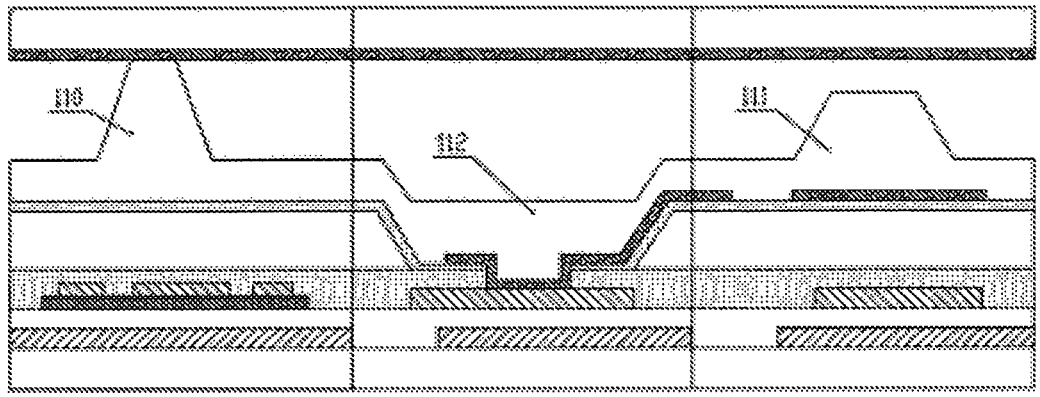
FIG. 1 illustrates a film structure of a liquid crystal display panel in the conventional art.
Figure 2:
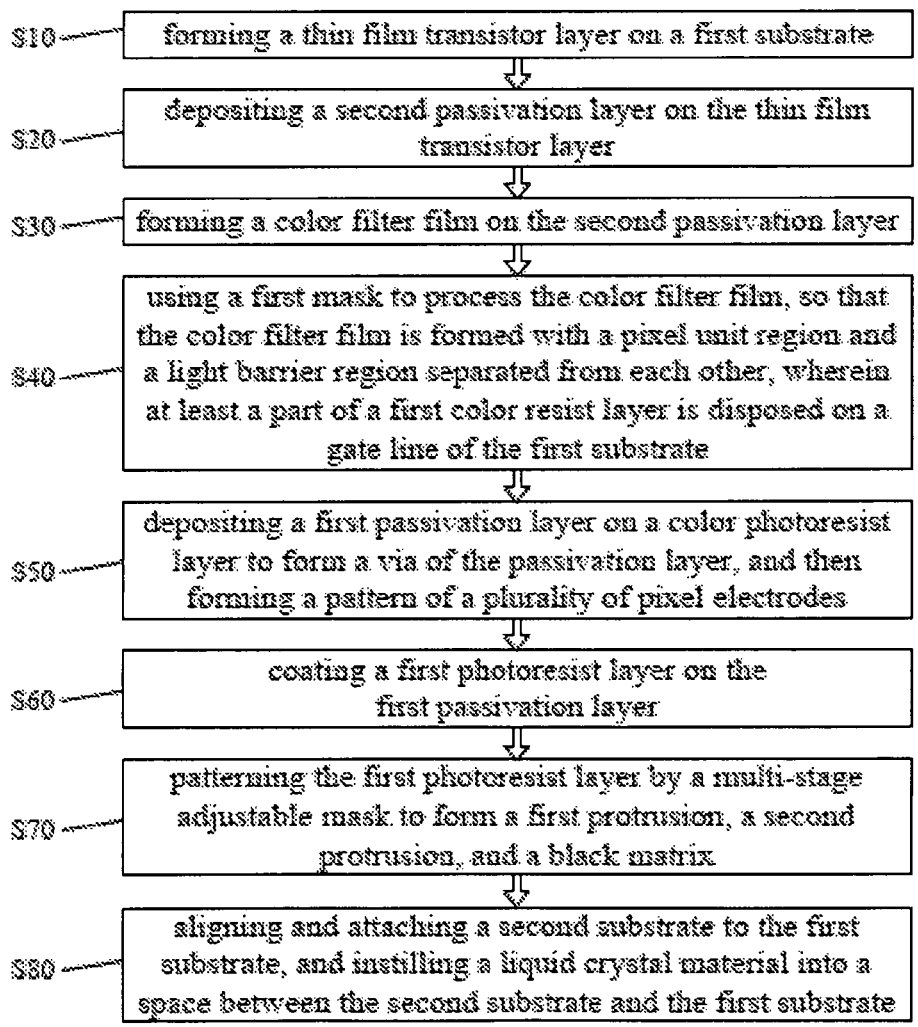
FIG. 2 illustrates a process flow of a manufacturing method of a liquid crystal display panel according the present invention.
Figure 3:
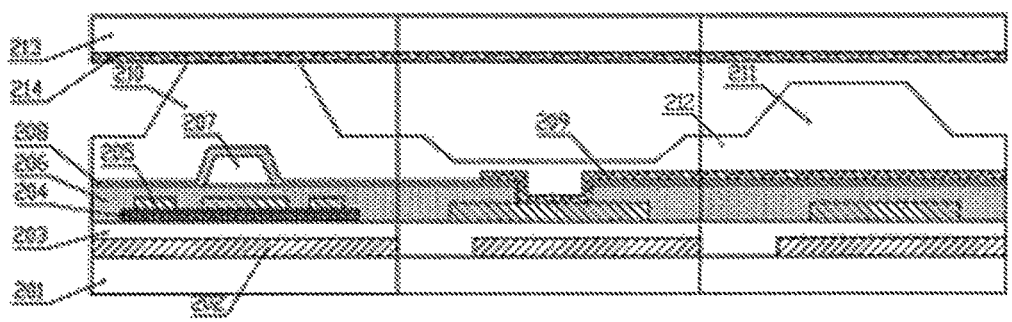
FIG. 3 illustrates a cross-sectional view of a film structure of a liquid crystal display panel according to the present invention.

Referring now to FIG. 3, a film structure of a liquid crystal display panel according to the present invention is illustrated. A manufacturing method of a liquid crystal display panel includes steps:

In a step S10, a thin film transistor layer is formed on a first substrate.

Wherein the step S10 further includes:

In a step S11, the first substrate is provided; and

Figure 3A:
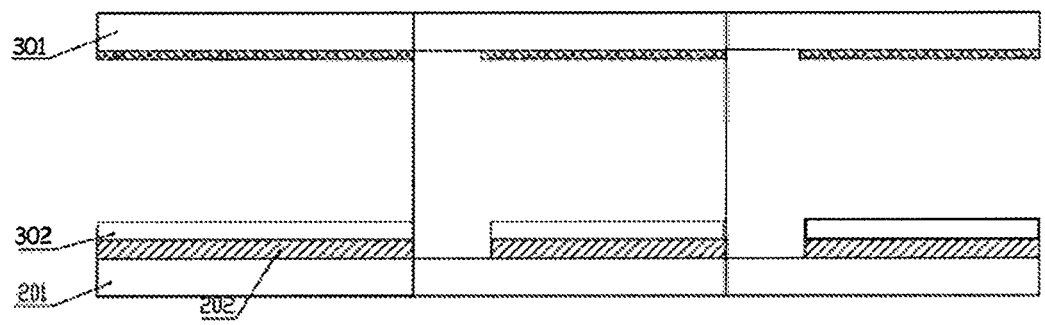
FIGS. 3A to 3I illustrate cross-sectional views of a manufacturing process of the liquid crystal display panel of FIG. 3 according to the present invention.
Figure 3B:
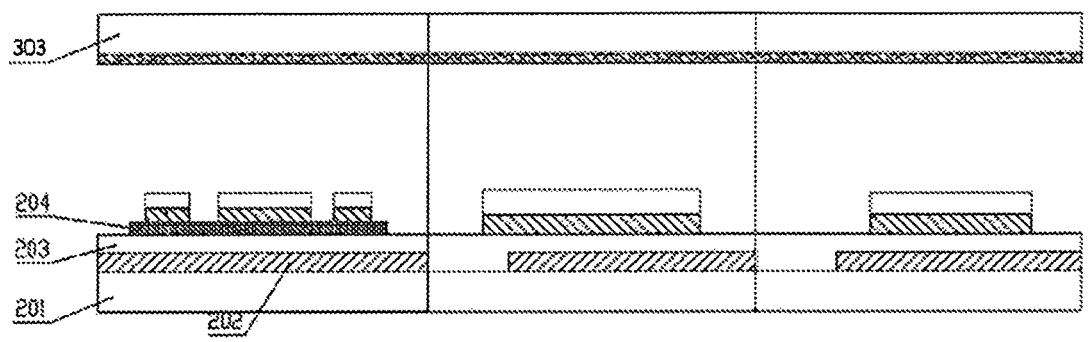
Figure 3C:
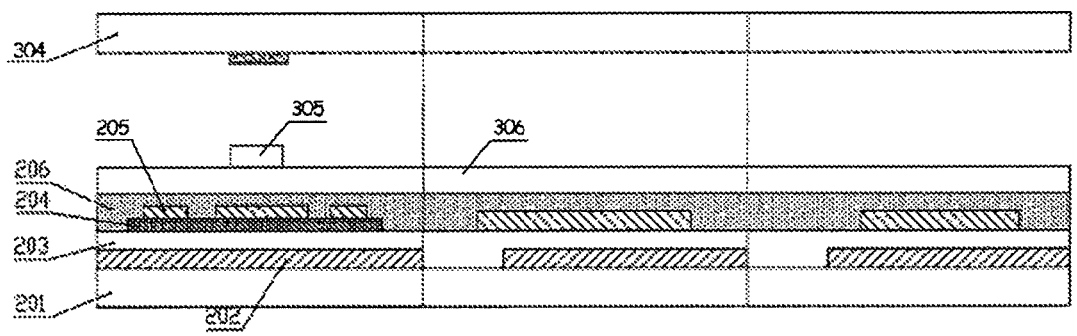

Please refer to FIGS. 3 and 3A, in a step S12, a gate 202 and a gate line of the thin film transistor is formed on the first substrate 201 by using a second mask 301.

The first substrate 201 is provided. A first metal film layer is deposited on the first substrate 201 by utilizing magnetron sputtering. The metal material may be typically selected from molybdenum, aluminum, aluminum-nickel alloy, molybdenum-tungsten alloy, chromium, copper, or a combination of the above-mentioned materials.

Next, a third photoresist layer 302 is coating on the first metal film layer, to form at least one gate 202 on the first substrate 201 by utilizing the patterning processes such as exposure through a mask, development, etching, and peeling off.

Please refer to FIGS. 3 and 3A, in a step S13, a gate insulating layer, an active layer, a source electrode, a drain electrode, and a third passivation layer of the thin film transistor are formed on a surface of the substrate by utilizing a third mask 303.

The gate insulating layer 203 is deposited on the first substrate 201 by a chemical method. In the present embodiment, a material of the gate insulating layer 203 is silicon nitride, and may also be silicon oxide and silicon oxynitride.

Then, a thin-film metal oxide may be deposited on the gate insulating layer 203 to be the active layer by sputtering method. Finally, a second metal layer may be deposited on the active layer by magnetron sputtering.

A fourth photoresist layer is coated on the substrate which the gate insulating layer 203, the active layer and the second metal layer are formed thereon, and the fourth photoresist layer is exposed and developed through a greyscale mask or a multi-stage transmittance mask. After the development, the second metal layer is subjected to an etching process. Finally, the fourth photoresist layer is peeled off, and a source or a drain 205 and an active pattern layer 204 are formed, wherein the second mask is a halftone mask or a grayscale mask.

In a step S20, a second passivation layer is deposited on the thin film transistor layer.

A second passivation layer 206 is deposited on the thin film transistor layer, wherein the second passivation layer 206 is typically a metal oxide, the second passivation layer 206 is configured to completely separate the metal from the corrosion medium, to prevent the metal contacting the corrosion medium, and thus protects the thin film transistor layer.

Figure 3D:
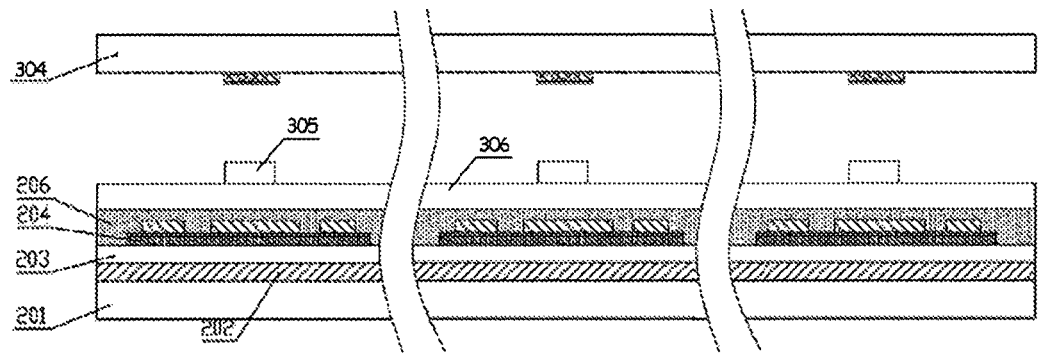
Figure 3E:
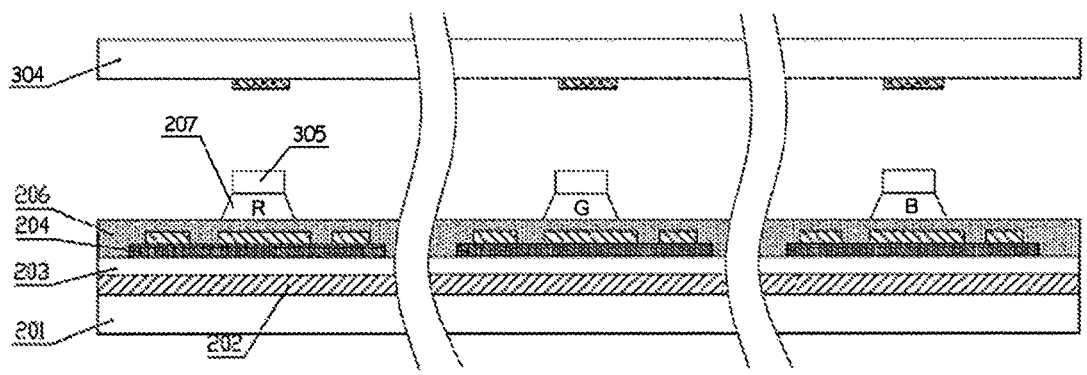

Please refer to FIG. 3 and FIGS. 3C to 3E. FIGS. 3D to 3E illustrate cross-sectional views of a plurality of drain/source electrodes and active layers of the liquid crystal display panel of FIG. 3C according to the present invention. in a step S30, a color filter film 306 is formed on the second passivation layer.

As shown in FIG. 3E, the color filter film 306 is formed on the second passivation layer 206, the color filter film 306 has a red color resist unit, a green color resist unit, and a blue color resist unit.

In a step S40, a first mask 304 is used to process the color filter film, such that the color filter film is formed with a pixel unit region and a light barrier region separated from each other, wherein at least a part of a first color resist layer 207 is disposed on a pate line of a first substrate 201.

A photoresist layer 305 is exposed and developed by a mask, and then the color filter film 306 is subjected to an etching process, to remove portions of the transparent photoresist material corresponding to a plurality of scanning lines, thus a plurality of first channels corresponding to the scanning lines are formed, to remove the transparent photoresist material corresponding to a plurality of data lines, and thus a plurality of second channels are formed, such that the color filter film 306 forms with a pixel unit region and a light barrier region separated from each other.

Wherein the light barrier region is corresponding to the scanning lines and the data lines which is in the thin film transistors, at least a portion of a first color resist layer 207 is disposed on the gate lines of the first substrate 201, and the first color resist layer 207 is one of the red color resist unit, green color resist unit, and blue color resist unit.

Figure 3F:
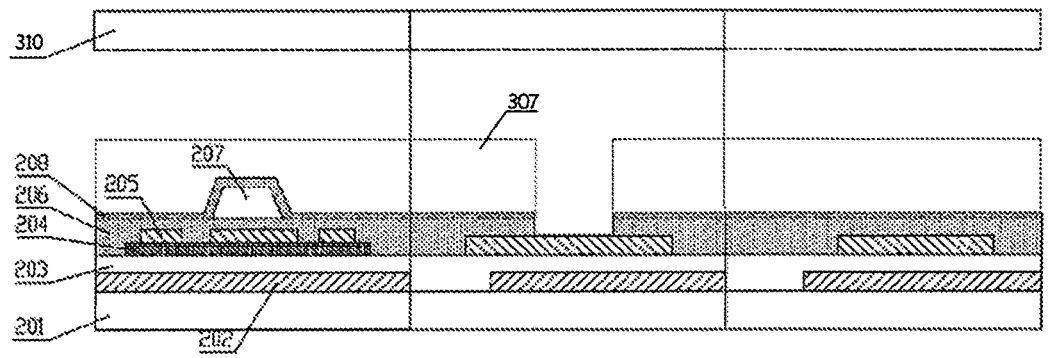

Please refer to FIG. 3F, in a step S50, a first passivation layer is deposited on the first color resist layer 207 to form a via of the passivation layer, and then a pattern of a plurality of pixel electrodes is formed.

Firstly, a first passivation layer 208 is deposited on the first color resist layer 207 and a second photoresist layer 307 is coated on the first passivation layer 208. Wherein the second photoresist layer 307 is a transparent photoresist material. And then, after the second photoresist layer 307 is exposed and developed, a via of the passivation layer is formed on the first passivation layer 208. Secondly, a transparent metal layer 209 is coated on the first passivation layer 208, the transparent metal is connecting with the source or the drain of the thin film transistor. Finally, the second photoresist layer 307 is peeling off to form a pattern of a plurality of pixel electrodes.

Figure 3G:
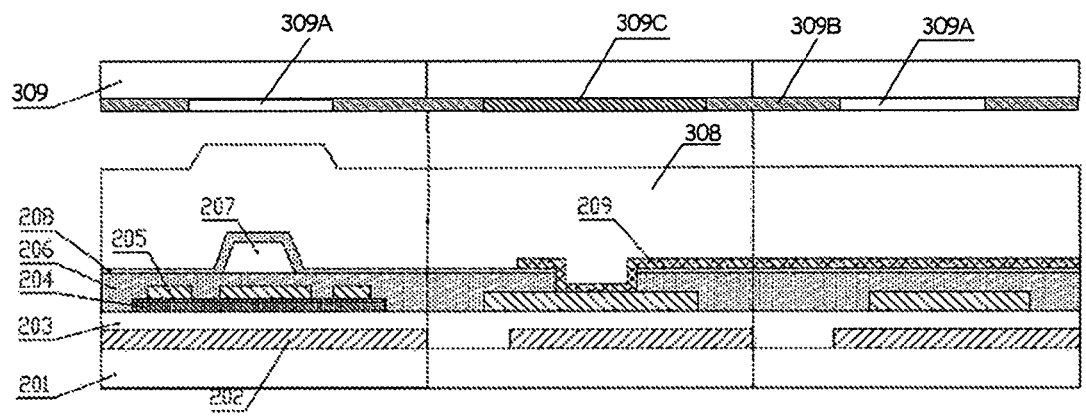

Please refer to FIG. 3 and FIG. 3G, in a step S60, a first photoresist layer 308 is coated on the first passivation layer.

The first photoresist layer is a black photoresist material and is a negative photoresist. The black photoresist is a new type of material which has the characteristics in the conventional technologies of spacer material, such as better elastic restoring force and lower contamination of liquid crystal etc., and further has higher value of optical density, thus can achieve the function of a light barrier and can achieve the effect of a black matrix. Therefore, by utilizing the characteristics of the black photoresist material, the black matrix and spacers can be simultaneously formed by only one mask process, thus the process steps are simplified, the manufacturing costs are reduced, and the efficiency of the process is increased.

Figure 3H:
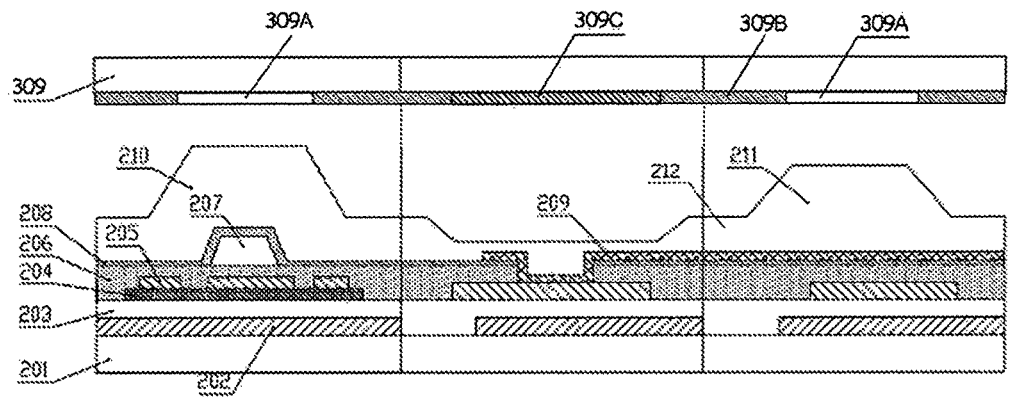

Please refer to FIG. 3 and FIG. 3H, in a step S70, the first photoresist layer 308 is patterned by a multi-tone mask to form a first protrusion, a second protrusion, and a black matrix.

Firstly, the multi-tone mask is a multi-stage transmittance mask 309, the first photoresist layer 308 is exposed and developed by a multi-stage transmittance mask 309, to pattern the first photoresist layer 308, thus the first protrusion 210, the second protrusion 211, and the black matrix 212 are formed.

Wherein the multi-stage transmittance mask includes a first transmittance region, a second transmittance region, and a third transmittance region. Light transmittances of the first transmittance region, the second transmittance region, and the third transmittance region are sequentially decreased. In the present embodiment, the first transmittance is 100% transmittance of light, the second transmittance is 20% transmittance of light, and the third transmittance is 0% transmittance of light.

Since the first photoresist layer is a negative photoresist, the portion which illuminates a light is not dissolved in the developer and the portion which did not illuminate a light is dissolved in the developer. Therefore, the first black photoresist material in the first transmittance region is completely retained, which is corresponding to the first protrusion 210 and the second protrusion 211.

In addition, since the first protrusion 210 is located above the first color resist disposed on the gate line, a height of the first protrusion 210 is greater than a height of the second protrusion 211 in a direction perpendicular to a plane of the liquid crystal display panel, thus the first protrusion 210 is a main spacer and the second protrusion 211 is an auxiliary spacer.

The second transmittance region is corresponding to the black matrix 212, and a portion of the black photoresist material is retained to act as a light barrier. The third transmittance region is corresponding to the pixel unit region, and 0% transmittance of light causes the photoresist in the pixel unit region to be completely dissolved in the developer due to the absence of illuminating a light.

The first protrusion 210, the second protrusion 211, and the black matrix 212 are located in the light barrier region. the first protrusion 210 or the second protrusion 211 is disposed between every two same color subpixels adjacent to each other, a first protrusion 210 is provided every A second protrusion 211, where A is a natural number. A space between the first protrusion 210 and the second protrusion 211 is a region of the black matrix 212.

Figure 3I:
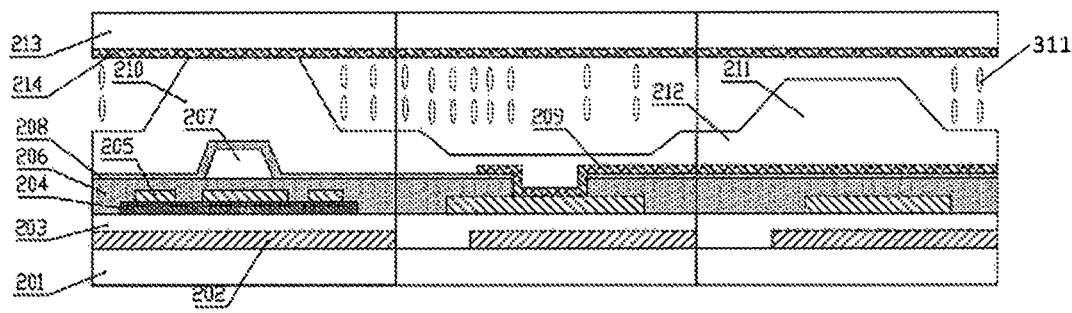

Please refer to FIG. 3I, in a step S80, a second substrate 213 is aligning and attaching to the first substrate 201, and instilling a liquid crystal material 311 into a space between the second substrate and the first substrate.

A second substrate 213 is provided, a common electrode layer 214 is formed on the second substrate 213, and a mask is formed on the common electrode of the second substrate 213 for aligning and attaching the first substrate 201 to the second substrate 213.

Since this present solution is an integration technique for directly fabricating a color filter layer on an array substrate, this method can effectively solve the problem that the liquid crystal display devices have light leakage caused by the alignment offset during the cell alignment process and can significantly improve the display aperture ratio.

The present invention provides a manufacturing method of a liquid crystal display panel, and an integration technique for directly fabricating a color filter layer on an array substrate, this method can effectively solve the problem that the liquid crystal display devices have light leakage caused by the alignment offset during the cell alignment process and can significantly improve the display aperture ratio. Next, the spacer material and the black matrix material are integrated into same material, and utilize a multi-tone mask and in only one lithography process form the spacer and the black matrix on the TFT array substrate, these can reduce the production cycle and the production cost. In addition, through at least a portion of a first color resist layer is configured to be disposed on a gate line of a first substrate as a color resist protrusion, under the same transmittance of illumination. The main spacers and the auxiliary spacers can be distinguished, thus the difficulty of the mask process can be reduced, and also the uniformity of the auxiliary spacers can be improved and the difficulty of the process is reduced.

In view of the above, although the present invention has been disclosed by way of preferred embodiments, the above preferred embodiments are not intended to limit the present invention, and one of ordinary skill in the art, without departing from the spirit and scope of the invention, the scope of protection of the present invention is defined by the scope of the claims.

What is claimed is:
1. A manufacturing method of a liquid crystal display panel, comprising:
    a step S40 of using a first mask to process a color filter film, such that the color filter film is formed with a pixel unit region and a light barrier region separated from each other, wherein at least a part of a first color resist layer is disposed on a gate line of a first substrate;
    a step S50 of depositing a first passivation layer on the first color resist layer to form a via of the passivation layer, and then forming a pattern of a plurality of pixel electrodes;
    a step S60 of coating a first photoresist layer on the first passivation layer;
    a step S70 of patterning the first photoresist layer by a multi-tone mask to form a first protrusion, a second protrusion, and a black matrix, wherein the first protrusion is located above the first color resist disposed on the gate line, color of color resist units of the first protrusion and color of color resist units of the second protrusion adjacent to each other is same; and a step S80 of aligning and attaching a second substrate to the first substrate, and instilling a liquid crystal material into a space between the second substrate and the first substrate.

2. The manufacturing method of the liquid crystal display panel according to claim 1, wherein before the step S40, the manufacturing method further comprises:
   a step S10 of forming a thin film transistor layer on the first substrate;
   a step S20 of depositing a second passivation layer on the thin film transistor layer; and
   a step S30 of forming the color filter film on the second passivation layer.

3. The manufacturing method of the liquid crystal display panel according to claim 2, wherein the step S10 further comprises:
   a step S11 of providing the first substrate;
   a step S12 of forming a gate and the gate line of the thin film transistor on the first substrate by using a second mask; and
   a step S13 of forming a gate insulating layer, an active layer, a source electrode, a drain electrode, and a third passivation layer of the thin film transistor on a surface of the substrate by using a third mask.

4. The manufacturing method of the liquid crystal display panel according to claim 1, wherein the step S50 further comprises:
   a step S51 of depositing the first passivation layer on the first color resist layer;
   a step S52 of coating a second photoresist layer on the first passivation layer;
   a step S53 of exposing and developing the second photoresist layer to form the via of the passivation layer on the first passivation layer;
   a step S54 of coating a transparent metal layer on the first passivation layer; and
   a step S55 of peeling the second photoresist layer off, so as to form the pattern of the pixel electrodes.

5. The manufacturing method of the liquid crystal display panel according to claim 1, wherein the step S70 further comprises steps of:
   exposing the first photoresist layer by using a multi-stage transmittance mask to pattern the first photoresist layer to form the first protrusion, the second protrusion, and the black matrix,
   wherein the multi-stage transmittance mask includes a first transmittance region, a second transmittance region, and a third transmittance region.

6. The manufacturing method of the liquid crystal display panel according to claim 1, wherein a height of the first protrusion is greater than a height of the second protrusion in a direction perpendicular to a plane of the liquid crystal display panel; and wherein the first protrusion is a main spacer and the second protrusion is an auxiliary spacer.

7. The manufacturing method of the liquid crystal display panel according to claim 5, wherein light transmittances of the first transmittance region, the second transmittance region, and the third transmittance region are sequentially decreased; wherein the first transmittance region corresponds to the first protrusion and the second protrusion, the second transmittance region corresponds to the black matrix, and the third transmittance region corresponds to the pixel unit area; and wherein the first protrusion, the second protrusion, and the black matrix are located within the light barrier region.

8. The manufacturing method of the liquid crystal display panel according to claim 1, wherein the color filter film comprises a red color resist unit, a green color resist unit, and a blue color resist unit; and wherein the first color resist layer is selected from one of the red color resist unit, the green color resist unit, and the blue color resist unit.

9. The manufacturing method of the liquid crystal display panel according to claim 1, wherein the first photoresist layer is a black photoresist material which is a negative photoresist.

10. A manufacturing method of a liquid crystal display panel, comprising:
    a step S40 of using a first mask to process a color filter film, such that the color filter film is formed with a pixel unit region and a light barrier region separated from each other, wherein at least a part of a first color resist layer is disposed on a gate line of a first substrate;
    a step S50 of depositing a first passivation layer on the first color resist layer to form a via of the passivation layer, and then forming a pattern of a plurality of pixel electrodes;
    a step S60 of coating a first photoresist layer on the first passivation layer;
    a step S70 of patterning the first photoresist layer by a multi-tone mask to form a first protrusion, a second protrusion, and a black matrix; and
    a step S80 of aligning and attaching a second substrate to the first substrate, and instilling a liquid crystal material into a space between the second substrate and the first substrate.

11. The manufacturing method of the liquid crystal display panel according to claim 10, wherein before the step S40, the manufacturing method further comprises:
    a step S10 of forming a thin film transistor layer on the first substrate;
    a step S20 of depositing a second passivation layer on the thin film transistor layer; and
    a step S30 of forming the color filter film on the second passivation layer.

12. The manufacturing method of the liquid crystal display panel according to claim 11, wherein the step S10 further comprises:
    a step S11 of providing the first substrate;
    a step S12 of forming a gate and the gate line of the thin film transistor on the first substrate by using a second mask; and
    a step S13 of forming a gate insulating layer, an active layer, a source electrode, a drain electrode, and a third passivation layer of the thin film transistor on a surface of the substrate by using a third mask.

13. The manufacturing method of the liquid crystal display panel according to claim 10, wherein the step S50 further comprises:
    a step S51 of depositing the first passivation layer on the first color resist layer;
    a step S52 of coating a second photoresist layer on the first passivation layer;
    a step S53 of exposing and developing the second photoresist layer to form the via of the passivation layer on the first passivation layer;
    a step S54 of coating a transparent metal layer on the first passivation layer; and
    a step S55 of peeling the second photoresist layer off, so as to form the pattern of the pixel electrodes.

14. The manufacturing method of the liquid crystal display panel according to claim 10, wherein the step S70 further comprises steps of:

exposing the first photoresist layer by using a multi-stage transmittance mask to pattern the first photoresist layer to form the first protrusion, the second protrusion, and the black matrix,
wherein the multi-stage transmittance mask includes a first transmittance region, a second transmittance region, and a third transmittance region.

15. The manufacturing method of the liquid crystal display panel according to claim 10, wherein a height of the first protrusion is greater than a height of the second protrusion in a direction perpendicular to a plane of the liquid crystal display panel; and wherein the first protrusion is a main spacer and the second protrusion is an auxiliary spacer.

16. The manufacturing method of the liquid crystal display panel according to claim 14, wherein light transmittances of the first transmittance region, the second transmittance region, and the third transmittance region are sequentially decreased; wherein the first transmittance region corresponds to the first protrusion and the second protrusion, the second transmittance region corresponds to the black matrix, and the third transmittance region corresponds to the pixel unit area; and wherein the first protrusion, the second protrusion, and the black matrix are located within the light barrier region.

17. The manufacturing method of the liquid crystal display panel according to claim 10, wherein the color filter film comprises a red color resist unit, a green color resist unit, and a blue color resist unit; wherein the first color resist layer is selected from one of the red color resist unit, the green color resist unit, and the blue color resist unit.

18. The manufacturing method of the liquid crystal display panel according to claim 10, wherein the first photoresist layer is a black photoresist material which is a negative photoresist.

* * * * *